United States Patent
Kanno (10) Patent No.: US 7,539,518 B2
(45) Date of Patent: May 26, 2009

(54) TIME DIVISION MULTIPLEXED SIGNAL RECEIVER APPARATUS

(75) Inventor: Ippei Kanno, Kyoto (JP)

(73) Assignee: Panasonic Corporation, Osaka (JP)

( * ) Notice: Subject to any disclaimer, the term of this patent is extended or adjusted under 35 U.S.C. 154(b) by 70 days.

(21) Appl. No.: 10/594,093

(22) PCT Filed: Mar. 30, 2005

(86) PCT No.: PCT/JP2005/006187

§ 371 (c)(1),
(2), (4) Date: May 21, 2007

(87) PCT Pub. No.: WO2005/096516

PCT Pub. Date: Oct. 13, 2005

(65) Prior Publication Data

US 2007/0274222 A1    Nov. 29, 2007

(30) Foreign Application Priority Data

Apr. 2, 2004  (JP) .............................. 2004-109776
Jan. 21, 2005 (JP) .............................. 2005-014813

(51) Int. Cl.
H04B 1/18   (2006.01)
H04M 1/00   (2006.01)

(52) U.S. Cl. .................................... 455/574; 455/343.2

(58) Field of Classification Search ................. 455/574, 455/67.13, 226.1, 226.2, 226.3, 343.1, 343.2, 455/343.5; 370/280, 311

See application file for complete search history.

(56) References Cited

U.S. PATENT DOCUMENTS

| | | | |
|---|---|---|---|
| 5,530,911 A * | 6/1996 | Lerner et al. | ............... 340/7.38 |
| 6,160,490 A * | 12/2000 | Pace et al. | ................. 340/7.37 |
| 6,208,837 B1 * | 3/2001 | Koh et al. | ................. 340/7.32 |
| 6,263,200 B1 * | 7/2001 | Fujimoto | ................. 455/343.5 |
| 6,370,111 B1 | 4/2002 | Takeda et al. | |
| 2004/0185820 A1 | 9/2004 | Ogura | |
| 2007/0004469 A1 * | 1/2007 | Arimitsu | ..................... 455/574 |

FOREIGN PATENT DOCUMENTS

| | | |
|---|---|---|
| EP | 0 959 574 | 11/1999 |
| JP | 5-327586 | 12/1993 |
| JP | 7-212269 | 8/1995 |
| JP | 10-155187 | 6/1998 |
| JP | 10-242903 | 9/1998 |
| JP | 10-290194 | 10/1998 |
| JP | 2004-221671 | 8/2004 |
| JP | 2004-242017 | 8/2004 |
| WO | 03/043210 | 5/2003 |

* cited by examiner

Primary Examiner—Nguyen Vo (57) ABSTRACT

To realize power saving of a receiver apparatus for receiving time-division multiplexed signals. In the receiver apparatus, power is supplied to a receiver circuit in accordance with an operation start time. A signal is received through the receiver circuit, and a quality of the received signal is evaluated by a signal quality evaluation unit 109. Control is exercised to set a late operation start time if the quality of the received signal is good, and an early operation start time if the quality of the received signal is bad. In this way, a period for supplying power to the receiver circuit can be adjusted according to the quality of the received signal. This makes it unnecessary to fix, as in conventional techniques, a long power supply period in consideration of the case where the signal quality is bad. As a result, more power saving can be achieved.

3 Claims, 9 Drawing Sheets

FIG.1

FIG.2A SIGNAL RECEPTION INTERVAL

FIG.2B POWER SUPPLY PERIOD WHEN SIGNAL QUALITY IS BAD

FIG.2C POWER SUPPLY PERIOD WHEN SIGNAL QUALITY IS GOOD

TIME DIVISION MULTIPLEXED SIGNAL RECEIVER APPARATUS

TECHNICAL FIELD

The present invention relates to a receiver apparatus for receiving time-division multiplexed signals, and especially relates to power saving techniques.

BACKGROUND ART

To receive a desired signal from a time-division multiplexed signal, a receiver apparatus that switches a power supply to a receiver circuit on and off according to signal reception timings has conventionally been used as shown in patent document 1 (see patent document 1).

The receiver apparatus shown in patent document 1 starts the power supply to the receiver circuit a predetermined time before reception of a signal begins, in order to suppress adverse effects caused by repeating power-on and power-off. One example of such adverse effects is as follows. By repeating power-on and power-off, a power supply voltage changes, which affects a PLL (Phase Locked Loop) circuit and causes frequency fluctuations. This adversely affects signal reception, such as by preventing stable signal reception at a reception timing.

According to the above construction, the power supply to the receiver circuit is started the predetermined time before the signal-reception begins, to bring the receiver circuit to operate stably by the time the signal reception begins. As a result, the receiver apparatus can stably receive the time-division multiplexed signal.

Patent document 1: Japanese Patent Application Publication No. H07-212269.

DISCLOSURE OF THE INVENTION

Problems the Invention is Going to Solve

A time needed to stabilize the operation of the receiver circuit depends on a quality of a received signal. For example, a time needed for frequency synchronization of the receiver circuit is shorter when the received signal is less influenced by noise, multipath fading, and the like, that is, when the received signal has a better quality.

Thus, the time needed for stabilizing the operation of the receiver circuit depends on the signal quality. Accordingly, if importance is placed on the stable reception of the time-division multiplexed signal in the above receiver apparatus, it is necessary to set the timing to start the power supply to the receiver circuit well in advance to ensure a longer power supply period than is necessary when the signal quality is good, so that the signal reception can stably be performed even if the signal quality is bad.

However, if importance is placed on the stable signal reception as mentioned above, power supplied to the receiver circuit will end up being partially wasted in the case where the quality of the received signal is good.

The present invention was conceived in view of the above problem, and aims to provide a receiver apparatus that is more power saving than conventional techniques.

Means of Solving the Problems

The stated aim can be achieved by a receiver apparatus in which an operation of a receiver circuit is started before reception of an assigned signal, and stopped, when the reception of the assigned signal ends, until before reception of a next assigned signal, including: an evaluation unit operable to evaluate a quality of the received assigned signal; a determination unit operable to determine an operation start time at which the operation of the receiver circuit is to be started for the reception of the next assigned signal, based on a result of the evaluation by the evaluation unit; and a control unit operable to start the operation of the receiver circuit at the determined operation start time.

EFFECTS OF THE INVENTION

According to this construction, the quality of the received signal is evaluated by, for example, measuring a BER (Bit Error Rate) of the received signal, and the operation start time of the receiver circuit is determined based on a result of this evaluation. For instance, an early operation start time is set when the quality of the received signal is bad, and a late operation start time is set when the quality of the received signal is good. In this way, the receiver apparatus can start the operation of the receiver circuit with an effective timing in accordance with the quality of the received signal. This contributes to more power saving than conventional techniques.

Here, the evaluation unit may evaluate whether the quality of the received assigned signal is good, wherein the determination unit determines the operation start time to be closer to a time at which the reception of the next assigned signal begins, when the quality of the received assigned signal is better.

According to this construction, a later operation start time is set when the quality of the received signal is better. Hence the receiver apparatus can supply power to the receiver circuit with a more effective timing.

Here, the evaluation unit may set an evaluation value corresponding to the quality of the received assigned signal, and compare the evaluation value with a predetermined value to evaluate whether the quality of the received assigned signal is good, wherein the determination unit stores information showing a plurality of predetermined times beforehand, and determines, as the operation start time, a predetermined time that is closer to the time at which the reception of the next assigned signal begins when the quality of the received assigned signal is good, and a predetermined time that is farther from the time at which the reception of the next assigned signal begins when the quality of the received assigned signal is not good.

According to this construction, an early or late operation start time is set depending on the quality of the received signal. For example, if the signal quality varies within a predetermined range, predetermined times are provided beforehand as potential operation start times according to the signal quality, with it being possible to determine the operation start time efficiently.

Here, the evaluation unit may include: an error rate measuring unit operable to measure an error rate of the received assigned signal, wherein the evaluation unit performs the evaluation based on the measured error rate. Here, the evaluation unit may include: a C/N measuring unit operable to measure a carrier-to-noise ratio of the received assigned signal, wherein the evaluation unit performs the evaluation based on the measured carrier-to-noise ratio. Here, the evaluation unit may include: a reception input level estimation unit operable to estimate a reception input level of the received assigned signal, wherein the evaluation unit performs the evaluation based on the estimated reception input level. Here, the evaluation unit may include: a channel characteristic estimation unit operable to estimate a channel characteristic of the received assigned signal using pilot carriers contained in the received assigned signal, wherein the evaluation unit performs the evaluation based on the estimated channel characteristic. Here, the evaluation unit may include: an interference signal detection unit operable to detect whether power of each sub-carrier contained in the received assigned signal is larger than a predetermined value, wherein the evaluation unit performs the evaluation based on a result of the detection by the interference signal detection unit.

According to these constructions, the receiver apparatus can evaluate the quality of the received signal and determine the operation start time of the receiver circuit using an index value that can be measured by the receiver apparatus itself, with there being no need to rely on a device other than the receiver apparatus.

Here, the receiver apparatus may further include: a pull-in time measuring unit operable to measure a pull-in time necessary for the operation of the receiver circuit to stabilize from when the operation of the receiver circuit is started; and a holding unit operable to hold information showing at least one pull-in time previously measured by the pull-in time measuring unit, wherein the evaluation unit performs the evaluation based on the information held in the holding unit.

According to this construction, the operation start time of the receiver circuit is determined by, for example, assigning a small weight to a pull-in time measured a long time ago and a large weight to a pull-in time measured recently, or using a mean value of pull-in times measured in the past. Thus, the operation start time can be determined in accordance with a signal quality tendency.

Here, the receiver apparatus may further include: a battery monitoring unit operable to measure a remaining battery level of the receiver apparatus, wherein the control unit starts the operation of the receiver circuit at the determined operation start time if the measured remaining battery level is no less than a predetermined value, and starts the operation of the receiver circuit at a predetermined time if the measured remaining battery level is less than the predetermined value.

According to this construction, when the remaining battery level is low, the operation start time of the receiver circuit is delayed to shorten the power supply period and thereby extend a signal receivable period of the receiver apparatus. This contributes to power saving.

The stated aim can also be achieved by a signal reception method used in a receiver apparatus in which an operation of a receiver circuit is started before reception of an assigned signal, and stopped, when the reception of the assigned signal ends, until before reception of a next assigned signal, including steps of: evaluating a quality of the received assigned signal; determining an operation start time at which the operation of the receiver circuit is to be started for the reception of the next assigned signal, based on a result of the evaluation; and starting the operation of the receiver circuit at the determined operation start time. The stated aim can also be achieved by an integrated circuit for executing a process in which an operation of a receiver circuit is started before reception of an assigned signal, and stopped, when the reception of the assigned signal ends, until before reception of a next assigned signal, including: an evaluation circuit operable to evaluate a quality of the received assigned signal; a determination circuit operable to determine an operation start time at which the operation of the receiver circuit is to be started for the reception of the next assigned signal, based on a result of the evaluation by the evaluation circuit; and a control circuit operable to start the operation of the receiver circuit at the determined operation start time.

According to these constructions, the operation start time of the receiver circuit is determined in accordance with the quality of the received signal, with it being possible to achieve more power saving than conventional techniques.

BEST MODE FOR CARRYING OUT THE INVENTION

The following describes embodiments of the present invention with reference to drawings.

FIRST EMBODIMENT

<Construction>

Figure 1:
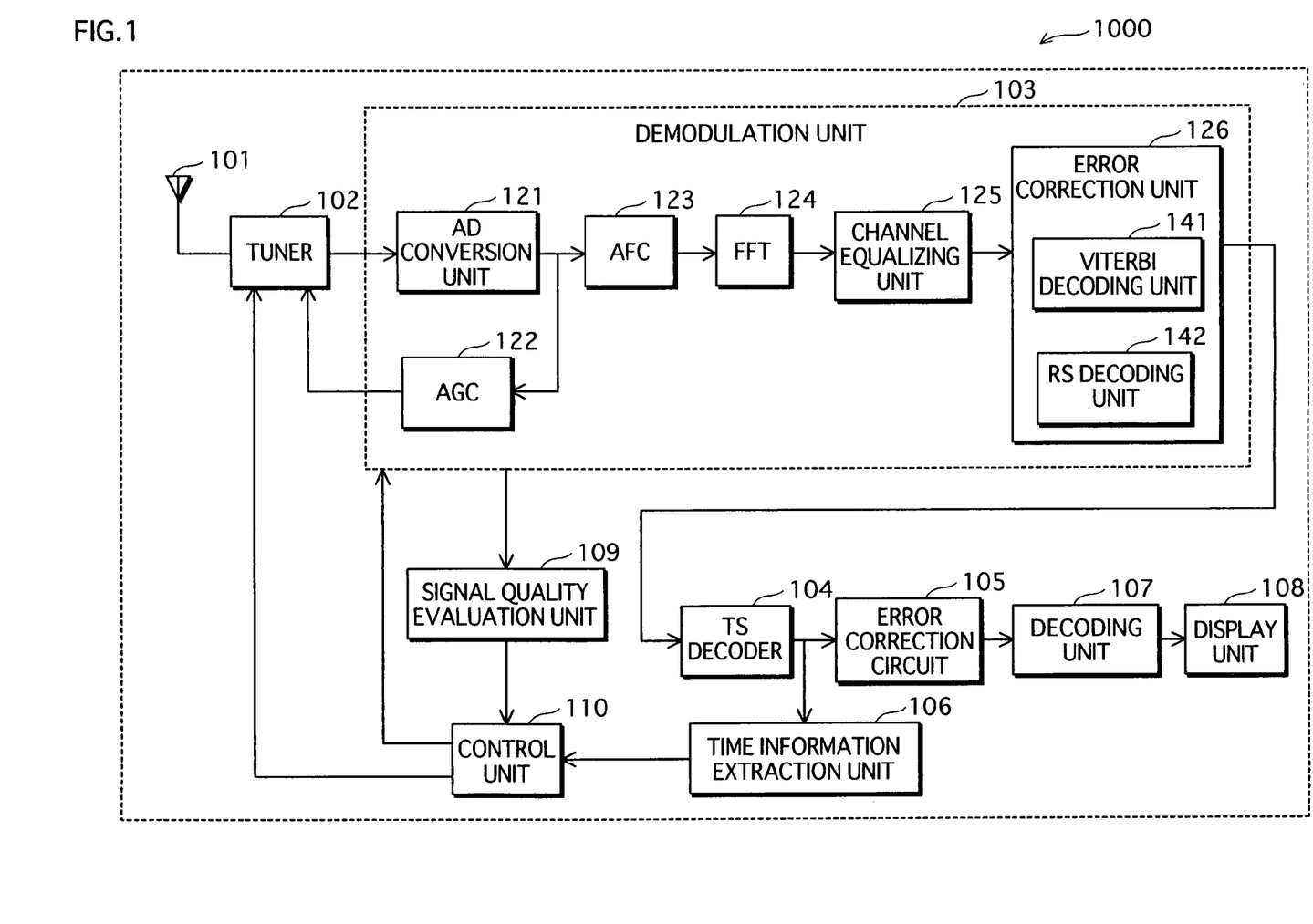
FIG. 1 is a functional block diagram showing the receiver apparatus according to the first embodiment.

FIG. 1 is a functional block diagram showing a receiver apparatus according to a first embodiment.

A receiver apparatus 1000 shown in the drawing receives a time-division multiplexed signal according to, for example, DVB-H (Digital Video Broadcasting-Handheld). DVB-H is a transmission method that adapts data broadcasting of DVB-T (Digital Video Broadcasting-Terrestrial) which is a terrestrial digital television transmission method in Europe, for bringing broadcast services to mobile receivers.

As shown in the drawing, the receiver apparatus 1000 includes an antenna 101, a tuner 102, a demodulation unit 103, a TS (Transport Stream) decoder 104, an error correction circuit 105, a time information extraction unit 106, a decoding unit 107, a display unit 108, a signal quality evaluation unit 109, and a control unit 110. The demodulation unit 103 is composed of a plurality of circuits.

The antenna 101 receives a DVB-H broadcast signal which is transmitted by time-division multiplexing, and outputs the received signal to the tuner 102.

The tuner 102 performs selection of a desired channel and adjustment of a signal gain.

The demodulation unit 103 includes an AD conversion unit 121, an AGC (Automatic Gain Control) 122, an AFC (Automatic Frequency Control) 123, a FFT (Fast Fourier Transform) 124, a channel equalizing unit 125, and an error correction unit 126. The demodulation unit 103 demodulates the signal and outputs a transport stream.

The AD conversion unit 121 converts the time-division multiplexed signal received by the tuner 102 to a digital signal, and outputs the digital signal to each of the AGC 122 and the AFC 123.

The AGC 122 generates an AGC control signal and outputs it to the tuner 102, to keep the output of the tuner 102 at a constant level.

The AFC 123 performs error correction on a carrier frequency of the received signal and a clock frequency, to establish synchronization in frequency and phase of a carrier and a clock.

The FFT 124 performs FFT on the received signal, thereby converting the received signal to a frequency axis.

The channel equalizing unit 125 performs channel equalization on the received signal which has been converted to the frequency axis, to remove channel distortion. The channel equalizing unit 125 performs detection and outputs a detection result to the error correction unit 126. When doing so, the channel equalizing unit 125 also measures a C/N (Carrier to Noise ratio), and outputs a value corresponding to a measurement result to the signal quality evaluation unit 109.

The error correction unit 126 includes a Viterbi decoding unit 141 and an RS (Reed-Solomon) decoding unit 142. The error correction unit 126 performs Viterbi decoding in the Viterbi decoding unit 141 and RS decoding in the RS decoding unit 142, on the detected signal from which the channel distortion has been removed by the channel equalizing unit 125. The error correction unit 126 outputs a resulting transport stream to the TS decoder 104.

The error correction unit 126 also measures a pre-Viterbi-decoding BER (Bit Error Rate) from a number of bit errors corrected by the Viterbi decoding, a post-Viterbi-decoding BER from a number of bit errors corrected by the RS decoding, and a post-RS-decoding packet error rate from a number of packets which could not be corrected by the RS decoding. The error correction unit 126 outputs values corresponding to results of these measurements to the signal quality evaluation unit 109.

The TS decoder 104 receives the transport stream from the demodulation unit 103, extracts transport stream packets (hereafter "TS packets") that contain a program which the user wants to view, and outputs the extracted TS packets to the error correction circuit 105 and the time information extraction unit 106.

The error correction circuit 105 is an MPE-FEC (Multi-Protocol Encapsulation-Forward Error Correction) circuit added for DVB-H, and performs error correction such as RS decoding. The error correction circuit 105 also measures a BER at the time of RS decoding.

The time information extraction unit 106 receives a TS packet from the TS decoder 104, and extracts time information which is newly defined by DVB-H in a section header of a section carried by the TS packet. The time information referred to here shows a signal reception interval from when transmission of one part of a desired program, among programs which are broadcast by time-division multiplexing, ends to when transmission of the next part of the desired program begins.

The decoding unit 107 is a circuit for decoding video data and audio data of a format such as MPEG (Moving Picture Experts Group)-4 and H.264. The decoding unit 107 outputs the decoded video data and audio data to the display unit 108.

The display unit 108 is a display device provided with a liquid crystal panel, a speaker, and the like, and outputs the video data and the audio data.

The signal quality evaluation unit 109 evaluates a quality of the received signal based on a parameter such as the BERs output from the demodulation unit 103, and outputs a value corresponding to a result of the evaluation to the control unit 110.

The control unit 110 adjusts a timing to supply power to the tuner 102, the demodulation unit 103, and the TS decoder 104, based on the time information extracted by the time information extraction unit 106 and the output value corresponding to the evaluation result of the signal quality evaluation unit 109. The control unit 110 can be constituted by a CPU (Central Processing Unit), a ROM (Read Only Memory), a RAM (Random Access Memory), and the like, and may exercise reception control and demodulation control in addition to the above power supply control.

<Operation>

An operation of the receiver apparatus 1000 is explained below.

Figure 2A:
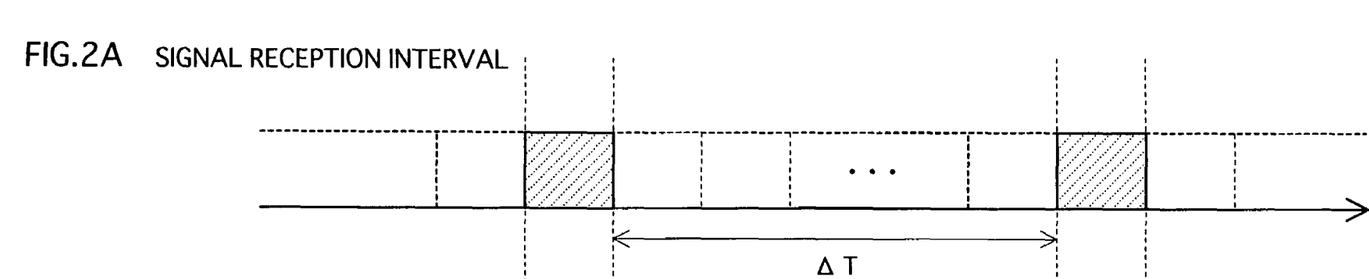
FIG. 2 shows the signal reception interval and the timing to power on/off the tuner 102, the demodulation unit 103, and the TS decoder 104.

In the receiver apparatus 1000, the control unit 110 controls the timing to supply power to the tuner 102, the demodulation unit 103, and the TS decoder 104 based on the time information extracted by the time information extraction unit 106, in order to receive the program desired by the user. FIG. 2 shows the signal reception interval and the timing to power on/off the tuner 102, the demodulation unit 103, and the TS decoder 104. FIG. 2A shows the signal reception interval. In this example, the signal reception interval is denoted by ΔT.

If effects of noise, multipath fading, interference signals, and the like are present, the quality of the received signal becomes bad. A time period necessary for the demodulation unit 103 to establish time and frequency synchronization between the clock and the carrier depends on the quality of the received signal. That is, the time period necessary for establishing the synchronization is longer when the quality of the received signal is worse.

This being so, the control unit 110 powers on the tuner 102, the demodulation unit 103, and the TS decoder 104 earlier than the signal reception timing so that the tuner 102, the demodulation unit 103, and the TS decoder 104 operate stably by the time the signal reception begins, in order to stably receive the desired part of the time-division multiplexed signal. In detail, the control unit 110 powers on the tuner 102, the demodulation unit 103, and the TS decoder 104 a predetermined time before the signal reception. This predetermined time is referred to as pull-in time ΔTcap.

Figure 2B:
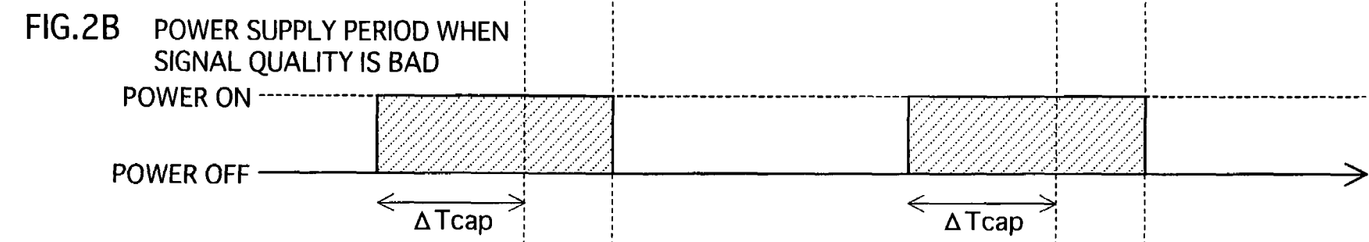

FIG. 2B shows the timing with which the control unit 110 powers on the tuner 102, the demodulation unit 103, and the TS decoder 104. The control unit 110 powers off the tuner 102, the demodulation unit 103, and the TS decoder 104 at a time where the transmission of the desired program ends. After this, the control unit 110 powers on the tuner 102, the demodulation unit 103, and the TS decoder 104 pull-in time ΔTcap earlier than when the transmission of the desired program resumes.

Which is to say, the control unit 110 powers on the tuner 102, the demodulation unit 103, and the TS decoder 104 when a time period (ΔT-ΔTcap) elapses after the transmission of the program ends, as shown in the drawing. The time at which the control unit 110 powers on the tuner 102, the demodulation unit 103, and the TS decoder 104 is hereafter called an "operation start time".

Thus, the receiver apparatus 1000 receives the time-division multiplexed signal, and powers on the tuner 102, the demodulation unit 103, and the TS decoder 104 based on the operation start time in order to stably receive the desired program.

A process of determining the operation start time and supplying power to the tuner 102, the demodulation unit 103, and the TS decoder 104 by the control unit 110 is explained below.

Figure 3:
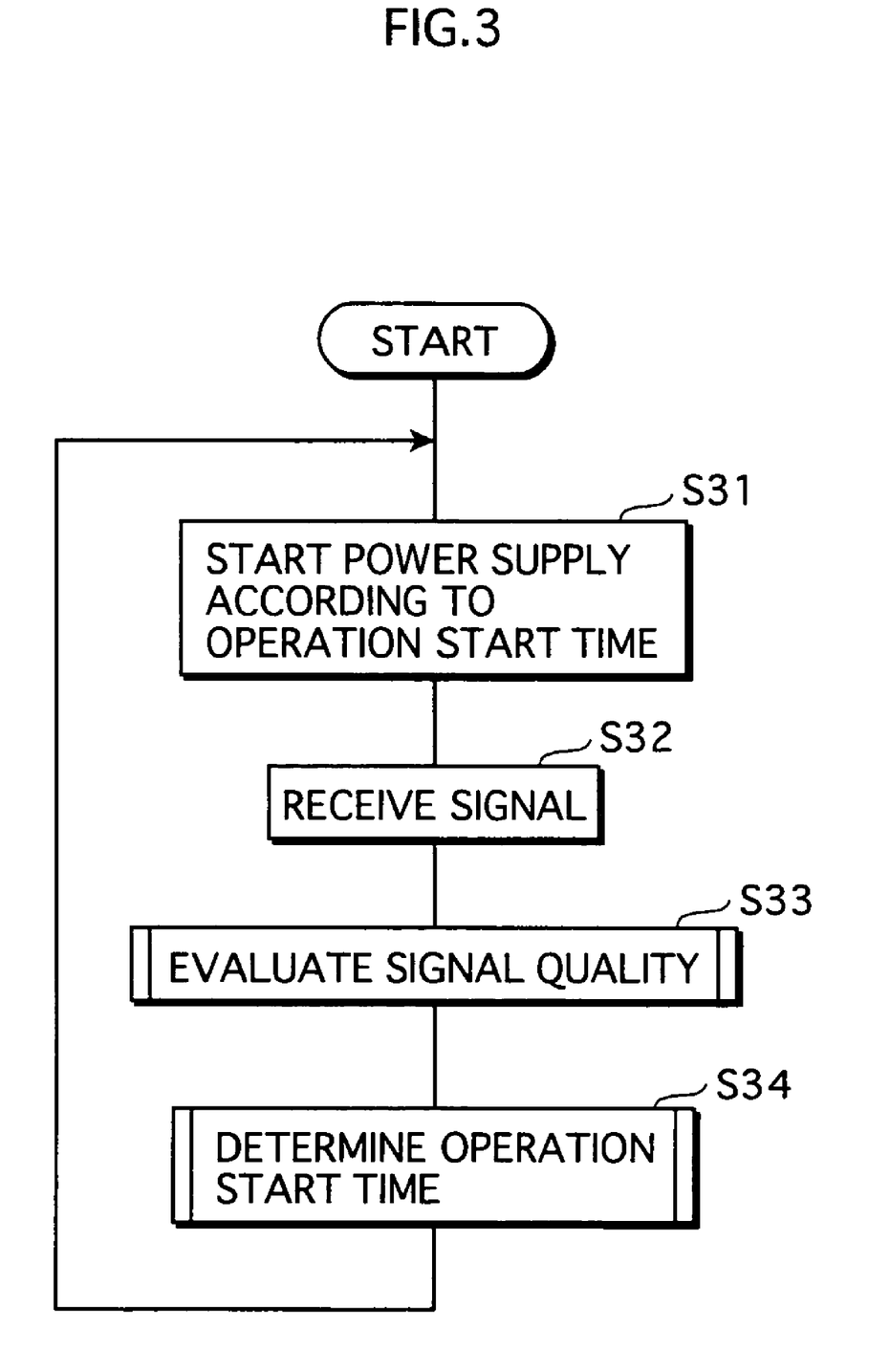
FIG. 3 is a flowchart showing the power supply control process by the control unit 110 in the receiver apparatus 1000.

FIG. 3 is a flowchart showing a power supply control process performed by the control unit 110 in the receiver apparatus 1000.

The control unit 110 supplies power to the tuner 102, the demodulation unit 103, and the TS decoder 104 according to the operation start time determined at immediately preceding signal reception (step S31), and receives a time-division multiplexed signal (step S32).

Once the demodulation unit 103 and the TS decoder 104 have performed their respective operations, the control unit 110 stops the power supply to the tuner 102, the demodulation unit 103, and the TS decoder 104 until the next operation start time. Also, the control unit 110 has the signal quality evaluation unit 109 evaluate the quality of the received signal based on a parameter such as the BERs measured by the error correction unit 126 in the demodulation unit 103 (step S33).

After the signal quality evaluation unit 109 evaluates the quality of the received signal, the control unit 110 determines the operation start time for the next signal reception based on the evaluation result (step S34). Having determined the operation start time, the control unit 110 repeats the procedure of starting the power supply to the tuner 102, the demodulation unit 103, and the TS decoder 104 according to the operation start time (step S31), receiving the signal, evaluating the quality of the received signal, and determining the operation start time (steps S32, S33, and S34).

<Signal Quality Evaluation>

Figure 4:
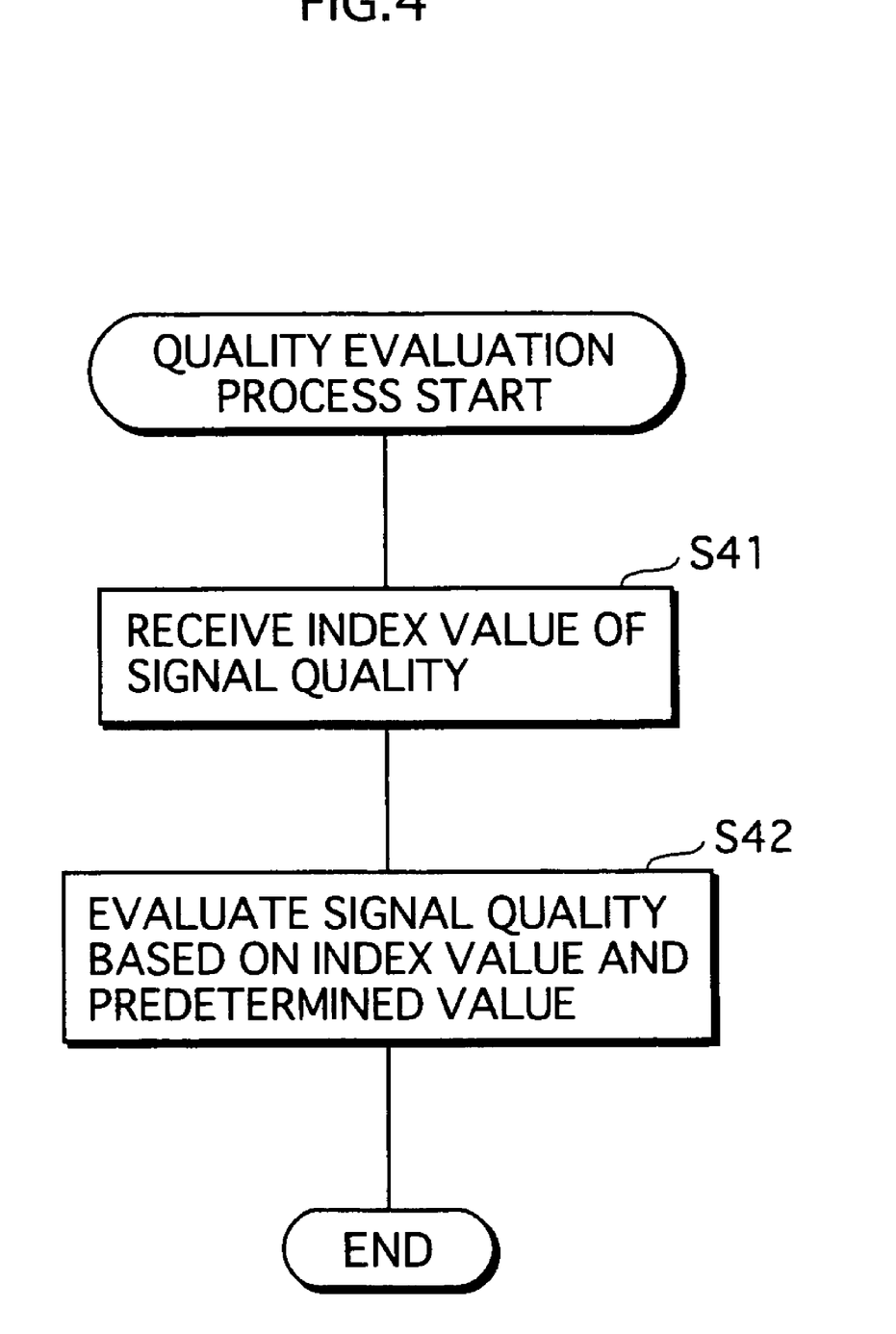
FIG. 4 is a flowchart showing the process of evaluating the signal quality by the signal quality evaluation unit 109.

The process of evaluating the quality of the signal by the signal quality evaluation unit 109 in step S33 is explained below.

FIG. 4 is a flowchart showing the process of evaluating the signal quality by the signal quality evaluation unit 109.

The signal quality evaluation unit 109 receives a measurement result of an index value indicating the signal quality, such as the BERs and packet error rate output from the Viterbi decoding unit 141 and the like in the demodulation unit 103 (step S41). The signal quality evaluation unit 109 compares the received measurement result with a predetermined value, to judge whether the signal quality is "good" or "bad" (step S42). As one example, the signal quality evaluation unit 109 sets a 1-bit flag showing the signal quality ON if the signal quality is "good", and OFF if the signal quality is "bad". The signal quality evaluation unit 109 outputs a signal showing the evaluation result to the control unit 110.

In more detail, the signal quality judgment in step S42 is conducted as follows. Take an example where the BER measured by the Viterbi decoding unit 141 is used as a signal quality index value and compared with a predetermined value. Suppose the predetermined value is $10^{-5}$. This being the case, the signal quality is evaluated as "good" if the BER is smaller than the predetermined value, and "bad" if the BER is no smaller than the predetermined value.

Here, as the signal quality index value, the BER measured by the RS decoding unit 142, the packet error rate measured by the RS decoding unit 142, or the BER measured by the error correction circuit 105 may be used instead of the above BER measured by the Viterbi decoding unit 141. By setting a predetermined value for each of these parameters, it is possible to evaluate the signal quality as "good" or "bad".

Also, the signal quality can be evaluated in accordance with a reception input level at the antenna 101, instead of the BER. The AGC 122 generates an AGC control signal so as to keep the output of the tuner 102 at a constant level, and controls a gain of an AGC amplifier included in the tuner 102 based on the AGC control signal. Accordingly, the signal quality evaluation unit 109 can estimate the reception input level based on this AGC control signal.

The signal quality evaluation based on the estimated reception input level can be conducted as follows. Suppose an adequate range of the reception input level is −80 dBm to −20 dBm. This being the case, the signal quality is evaluated as "good" if the estimated reception input level is within the adequate range, and "bad" if the estimated reception input level is not within the adequate range.

As an alternative, the signal quality evaluation may be conducted as follows. A frequency domain signal after the FFT is performed by the FFT 124 represents each sub-carrier. If a sub-carrier whose level is, for example, about 30 dB larger than other sub-carriers is detected, there is a possibility of interference by analog broadcasting or the like. This being so, the signal quality is evaluated as "bad" if the interference is estimated to exist, and "good" if the interference is estimated not to exist.

Also, the signal quality evaluation may be conducted based on the C/N measured and output by the channel equalizing unit 125. For example, the signal quality is evaluated as "good" if the C/N is no less than 10 dB, and "bad" if the C/N is less than 10 dB.

Further, the signal quality evaluation may be conducted as follows. In the detection performed by the channel equalizing unit 125, a channel characteristic of the received signal is estimated using pilot carriers which are provided in a frequency direction and a time direction based on a predetermined rule, and the received signal is equalized by dividing the received signal by the estimated channel characteristic. Here, multipath fading and the like can be detected from the estimated channel characteristic. Accordingly, the signal quality may be evaluated as "bad" if multipath fading is detected.

<Operation Start Time Determination Process>

The following explains the process of step S34 in FIG. 3 where the control unit 110 determines the operation start time for the next signal reception based on the result of the signal quality evaluation by the signal quality evaluation unit 109.

Figure 5:
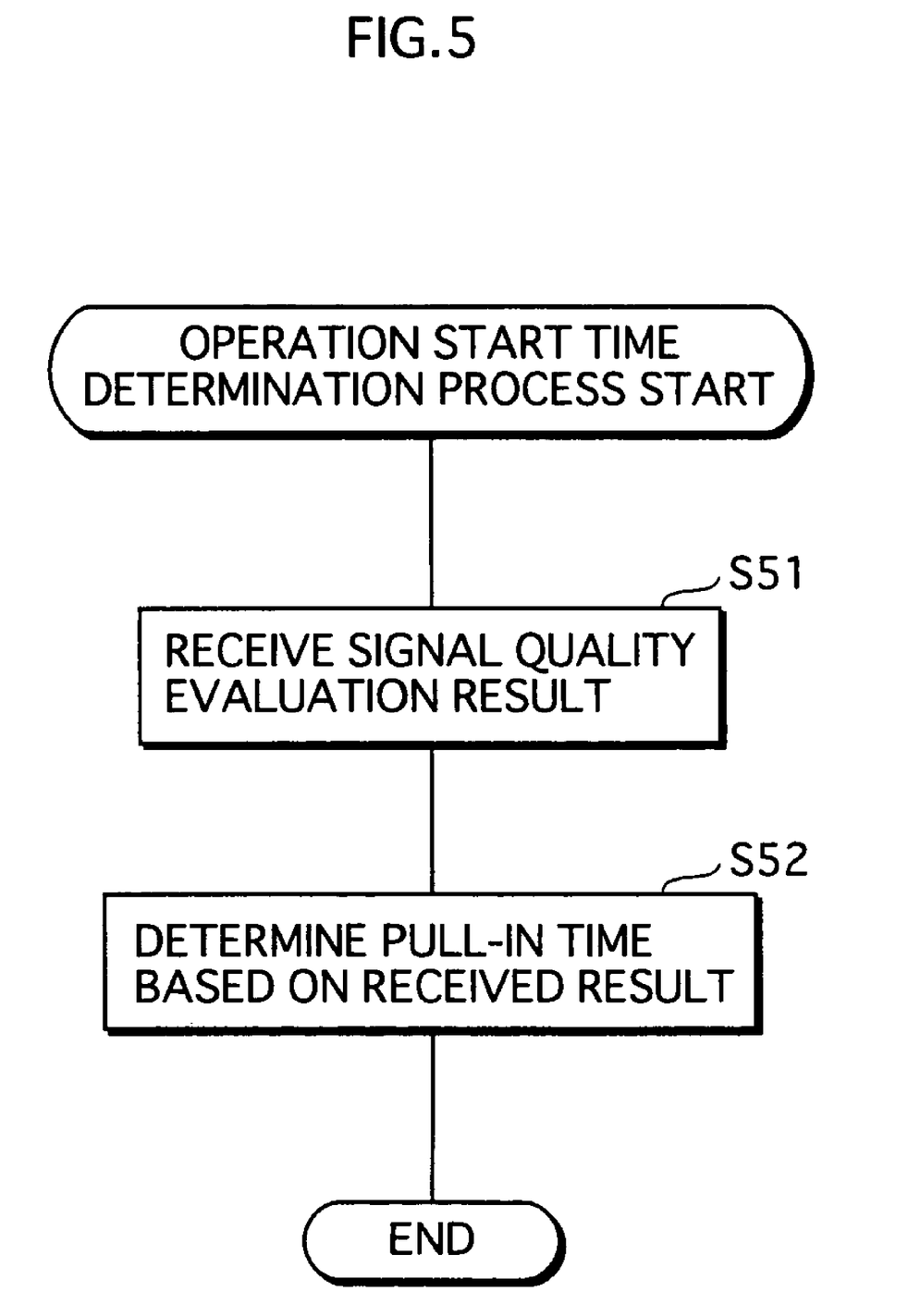
FIG. 5 is a flowchart showing the process of determining the operation start time for the next signal reception based on the signal quality evaluation result by the control unit 110.

FIG. 5 is a flowchart showing the process of determining the operation start time for the next signal reception based on the signal quality evaluation result by the control unit 110.

The control unit 110 receives the signal showing the signal quality evaluation result from the signal quality evaluation unit 109 (step S51), and determines pull-in time ΔTcap based on the received signal (step S52).

Figure 2C:
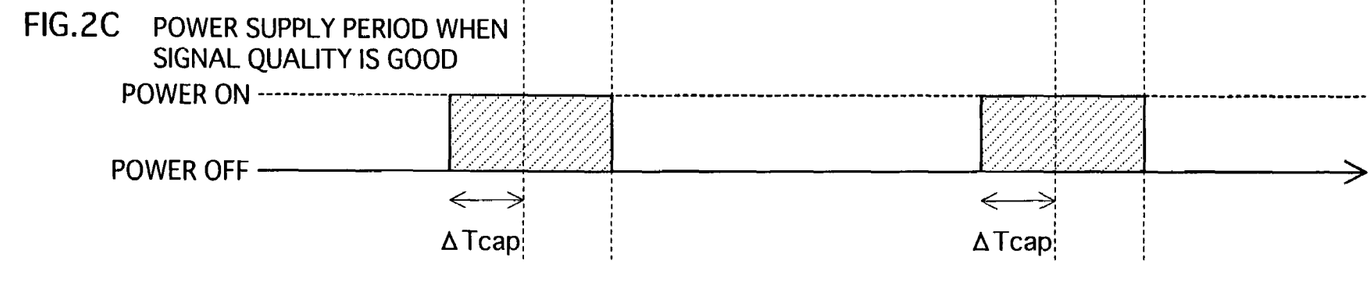

As one example, pull-in time ΔTcap1 in the case where the signal quality is "good" is set to 250 ms, and pull-in time ΔTcap2 in the case where the signal quality is "bad" is set to 500 ms, thereby making the power supply period shorter when the signal quality is "good" than when the signal quality is "bad". This is explained with reference to FIG. 2. FIG. 2B shows the power supply period of the tuner 102, the demodulation unit 103, and the TS decoder 104 when the signal quality is "bad", whereas FIG. 2C shows the power supply period of the tuner 102, the demodulation unit 103, and the TS decoder 104 when the signal quality is "good". The power supply period is adjusted to be shorter when the signal quality is "good" than when the signal quality is "bad", as shown in these drawings.

Note here that pull-in time ΔTcap for the initial signal reception is set, for example, to 500 ms beforehand.

In this way, the control unit 110 controls the timing to supply power to the tuner 102, the demodulation unit 103, and the TS decoder 104 in accordance with the quality of the received signal.

SECOND EMBODIMENT

The following describes a receiver apparatus according to a second embodiment.

In the second embodiment, pull-in time ΔTcap is determined based on a previous pull-in time, when determining the operation start time. The following explanation mainly focuses on the difference from the first embodiment.

<Construction>

Figure 6:
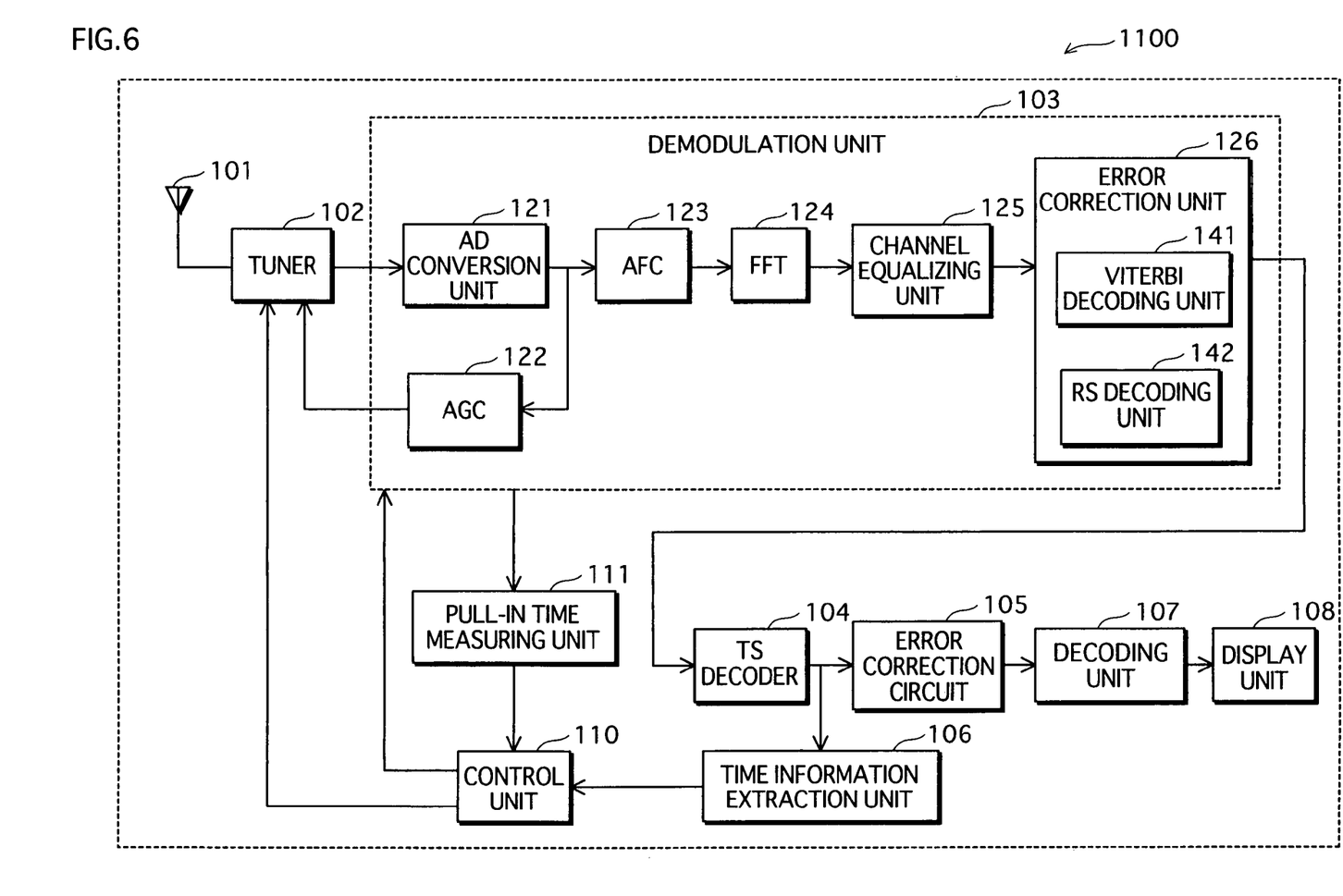
FIG. 6 is a functional block diagram showing the receiver apparatus according to the second embodiment.

FIG. 6 is a functional block diagram showing the receiver apparatus of the second embodiment.

A receiver apparatus 1100 shown in the drawing differs from the receiver apparatus 1000 of the first embodiment, in that a pull-in time measuring unit 111 is provided in place of the signal quality evaluation unit 109. Construction elements such as the antenna 101 are the same as those of the first embodiment, and so their explanation has been omitted here.

The pull-in time measuring unit 111 has a timer function of counting a time, and may be constituted by a CPU, a ROM, a RAM, and the like. The pull-in time measuring unit 111 measures pull-in time ΔTcap, and stores one or more previously measured pull-in times ΔTcap in a memory.

The measurement of pull-in time ΔTcap is performed by calculating a difference between a pull-in start time and a pull-in end time. Here, the pull-in start time is a time at which the control unit 110 powers on the tuner 102 and the like, and the pull-in end time is a time at which a BER or a C/N after the channel selection by the tuner 102 becomes no more than a threshold value.

The control unit 110 determines pull-in time ΔTcap based on one or more pull-in times ΔTcap measured and stored by the pull-in time measuring unit 111, and controls the power supply timing of the tuner 102 and the like.

<Operation>

In the receiver apparatus 1100, the control unit 110 determines the operation start time and controls the power supply to the tuner 102, the demodulation unit 103, and the TS decoder 104, during the reception of the time-division multiplexed signal.

Figure 7:
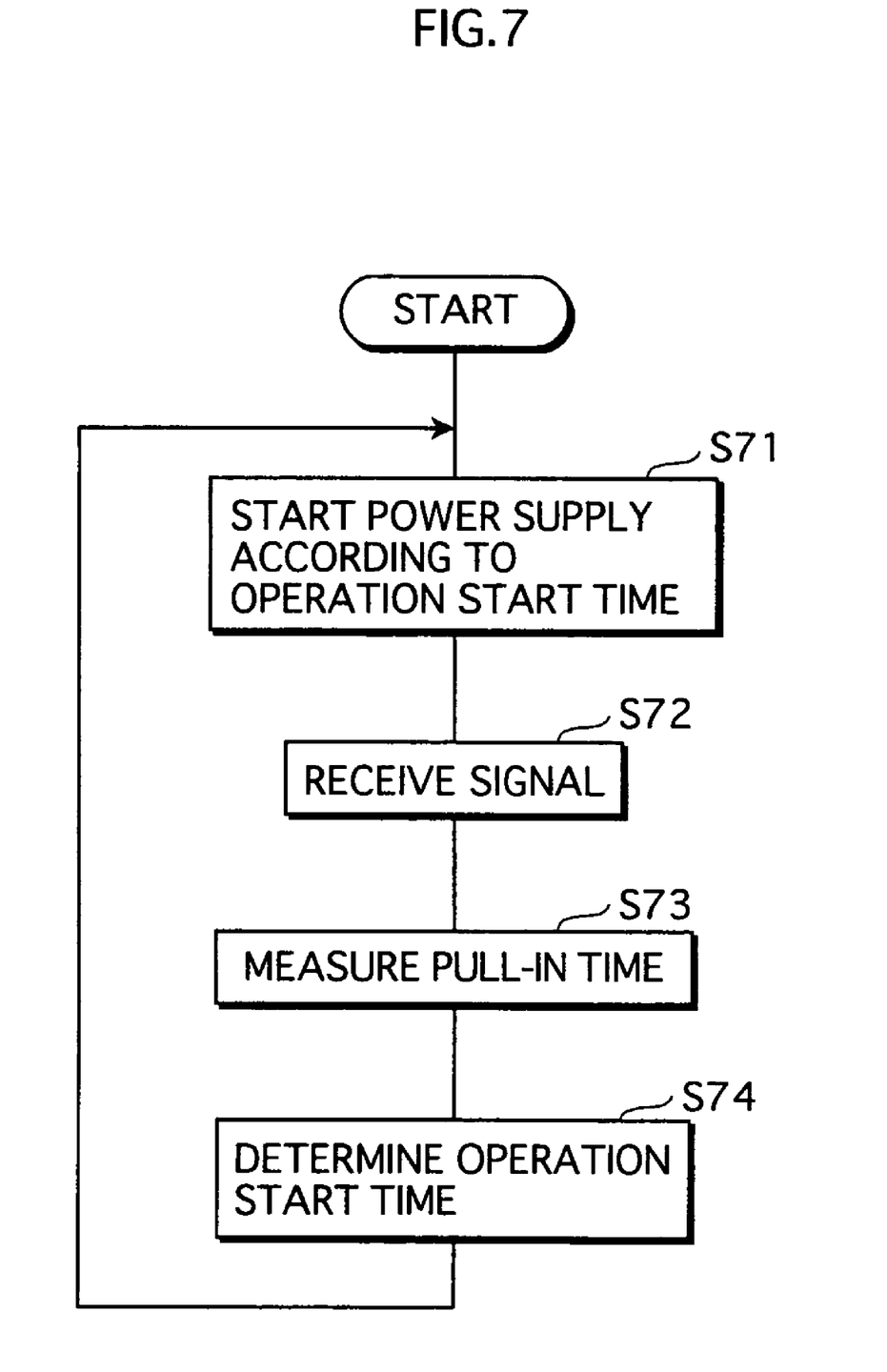
FIG. 7 is a flowchart showing the power supply control process by the control unit 110 in the receiver apparatus 1100.

FIG. 7 is a flowchart showing a power supply control process performed by the control unit 110 in the receiver apparatus 1100.

The control unit 110 supplies power to the tuner 102, the demodulation unit 103, and the TS decoder 104 according to the operation start time determined at the immediately preceding signal reception (step S71), receives the time-division multiplexed signal (step S72), and has the pull-in time measuring unit 111 measure a pull-in time (step S73).

Once the demodulation unit 103 and the TS decoder 104 have performed their respective operations, the control unit 110 stops the power supply to the tuner 102, the demodulation unit 103, and the TS decoder 104 until the next operation start time. The control unit 110 also compares a mean value of pull-in times ΔTcap previously measured by the pull-in time measuring unit 111 with a predetermined value, and determines pull-in time ΔTcap based on a result of the comparison.

Suppose the predetermined value is 300 ms. Then lead-time ΔTcap is set to 500 ms if the mean value of previous four pull-in times ΔTcap is larger than 300 ms, and 250 ms if the mean value of previous four pull-in times ΔTcap is no larger than 300 ms.

Having determined lead-time ΔTcap in this way, the control unit 110 determines the operation start time for the next signal reception from time information ΔT and pull-in time ΔTcap (step S74).

After this, the control unit 110 repeats the procedure of supplying power to the tuner 102 and the like according to the operation start time (step S71), receiving the signal, determining pull-in time ΔTcap for the next signal reception based on previous pull-in times ΔTcap, and determining the operation start time (steps S72, S73, and S74).

THIRD EMBODIMENT

The following describes a receiver apparatus according to a third embodiment.

In the third embodiment, pull-in time ΔTcap is determined based on a remaining battery level of the receiver apparatus in addition to the quality of the received signal, when determining the operation start time. The following explanation mainly focuses on the difference from the first embodiment.

<Construction>

Figure 8:
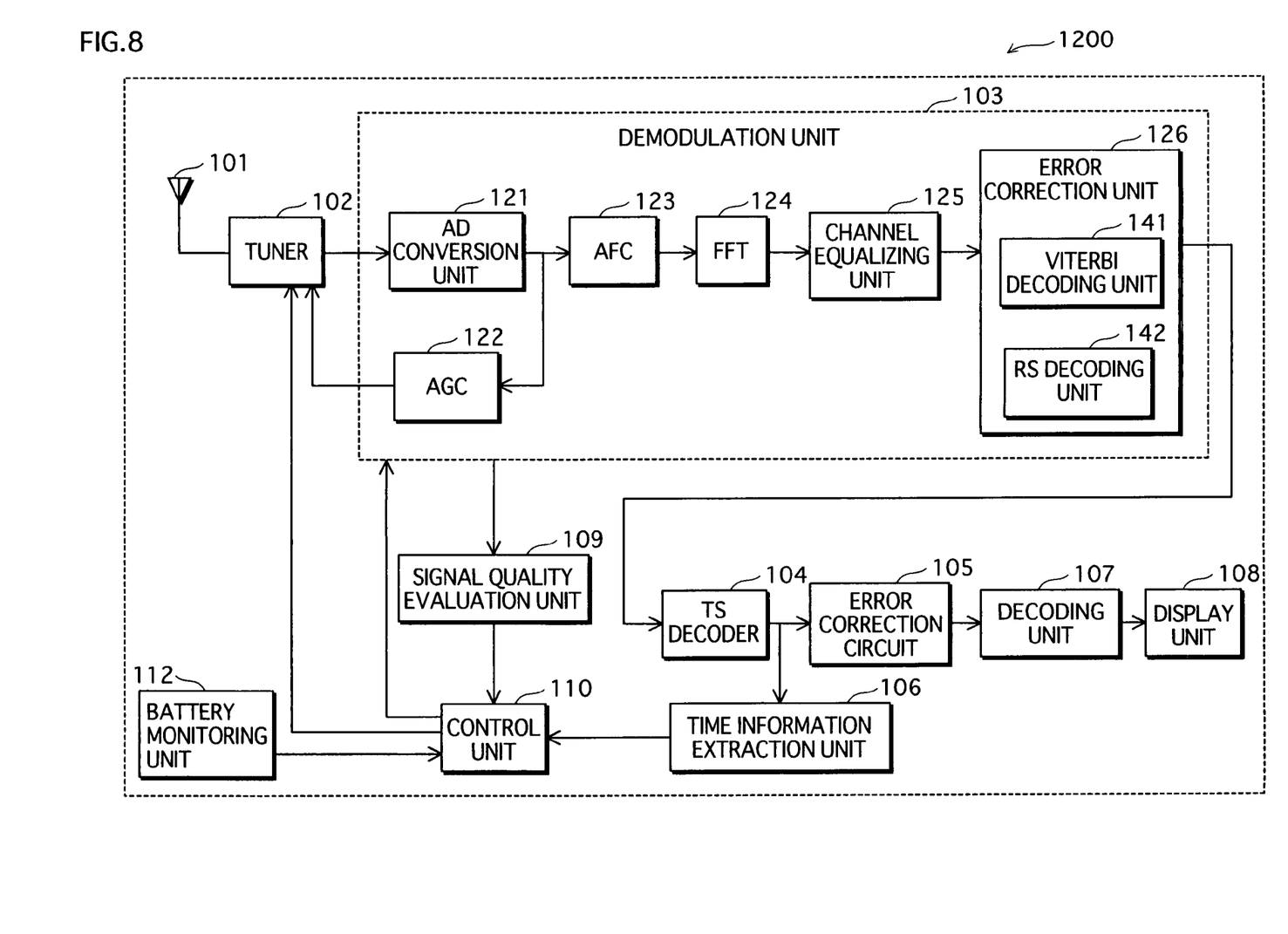
FIG. 8 is a functional block diagram showing the receiver apparatus according to the third embodiment.

FIG. 8 is a functional block diagram showing the receiver apparatus of the third embodiment.

A receiver apparatus 1200 shown in the drawing includes a battery monitoring unit 112 in addition to the construction of the receiver apparatus 1000 of the first embodiment.

The battery monitoring unit 112 measures the remaining battery level of the receiver apparatus 1200, and outputs the measured remaining battery level to the control unit 110 in percentage as one example.

The control unit 110 controls the timing to supply power to the tuner 102 and the like based on the quality of the received signal, and also receives a signal indicating the remaining battery level from the battery monitoring unit 112 and determines the operation start time depending on the remaining battery level.

<Operation>

In the receiver apparatus 1200, the control unit 110 determines the operation start time and controls the power supply to the tuner 102, the demodulation unit 103, and the TS decoder 104, during the reception of the time-division multiplexed signal.

Figure 9:
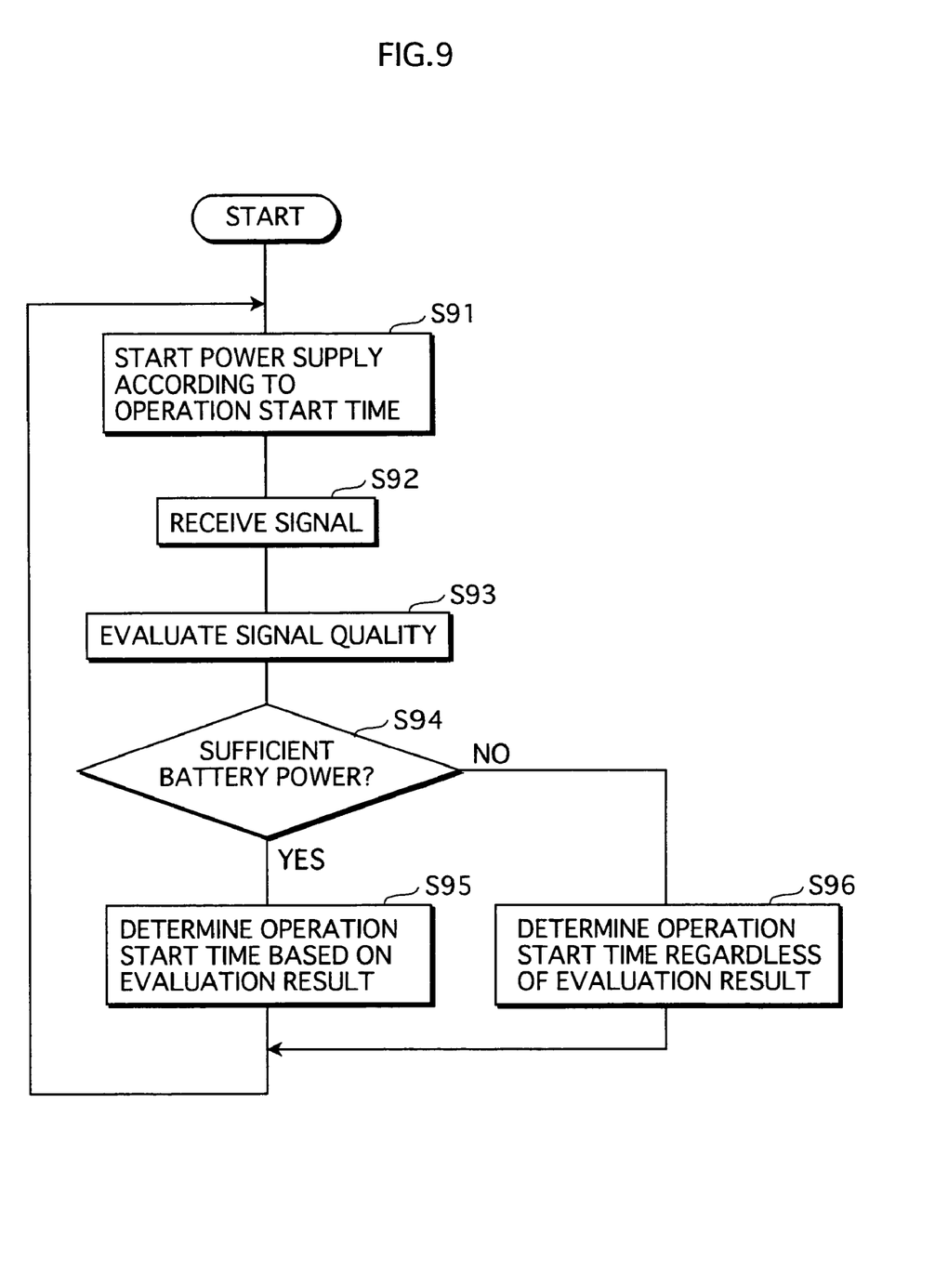
FIG. 9 is a flowchart showing the power supply control process by the control unit 110 in the receiver apparatus 1200.

FIG. 9 is a flowchart showing a power supply control process performed by the control unit 110 in the receiver apparatus 1200.

The control unit 110 supplies power to the tuner 102, the demodulation unit 103, and the TS decoder 104 according to the operation start time determined at the immediately preceding signal reception (step S91), and receives the time-division multiplexed signal (step S92).

Once the demodulation unit 103 and the TS decoder 104 have performed their respective operations, the control unit 110 stops the power supply to the tuner 102, the demodulation unit 103, and the TS decoder 104 until the next operation start time, and has the signal quality evaluation unit 109 evaluate the quality of the received signal (step S93).

After the signal quality evaluation unit 109 evaluates the quality of the signal received by the receiver apparatus 1200, the control unit 110 compares the remaining battery level with the predetermined value based on the signal showing the remaining battery level output from the battery monitoring unit 112, to judge whether the remaining battery level is sufficient (step S94) If the remaining battery level is no less than the predetermined value (step S94: YES), the control unit 110 judges the remaining battery level as sufficient, and determines the operation start time for the next signal reception based on the evaluation result of the signal quality evaluation unit 109 (step S95) If the remaining battery level is less than the predetermined value (step S94: NO), the control unit 110 judges the remaining battery level as insufficient, and sets pull-in time ΔTcap to be the same as the pull-in time that is used when the signal quality evaluation unit 109 evaluates the signal quality as "good", irrespective of the evaluation result of the signal quality evaluation unit 109 (step S96).

For instance, step S94 is performed by judging the remaining battery level of the receiver apparatus 1200 as sufficient if the remaining battery level is no less than 20%, and insufficient if the remaining battery level is less than 20%.

Thus, the receiver apparatus 1200 can adjust the power supply period in accordance with the remaining battery level. If the remaining battery level is insufficient, the power supply period of the tuner 102 and the like is shortened irrespective of the signal quality. This raises a possibility that the viewing may be interrupted in the case where the quality of the received signal continues to be bad, but the power consumption needed for the viewing can be reduced, with it being possible to extend a viewing period of video data and the like than in conventional techniques.

<Supplementary Remarks>

Although the present invention has been described by way of the above embodiments, the receiver apparatus according to the present invention is not limited to the above embodiments.

(1) The above embodiments describe the case where the signal quality evaluation unit 109 outputs the two values indicating the signal quality, namely, "good" and "bad", and the control unit 110 sets two pull-in times ΔTcap in accordance with the signal quality. However, the present invention is not limited to this. An example modification is given below. The signal quality evaluation unit 109 consecutively outputs values showing the signal quality using index values of the signal quality, and the control unit 110 sets several different pull-in times ΔTcap according to the values output from the signal quality evaluation unit 109.

The above embodiments describe the case where the signal quality evaluation unit 109 evaluates the signal quality by comparing the index value of the signal quality with one predetermined value, but the number of predetermined values used for the comparison is not limited to one. For example, the signal quality may be evaluated in several stages using threshold values.

(2) The above embodiments describe the case where the control unit 110 controls the power supply to the tuner 102, the demodulation unit 103, and the TS decoder 104. Considering that the tuner 102 has a local oscillator for channel selection and a certain period of time is needed from power-on until a frequency of an oscillator output stabilizes, however, the following modification may be applied. The control unit 110 separately generates a power supply control signal for the tuner 102 and a power supply control signal for the demodulation unit 103 and the TS decoder 104, so as to power on the tuner 102 earlier than the demodulation unit 103 and the TS decoder 104.

Also, in view of a processing delay time of the demodulation unit 103, different power supply timings may be applied to the demodulation unit 103 and the TS decoder 104.

The above embodiments describe the case where the control unit 110 controls the power supply to the tuner 102, the demodulation unit 103, and the TS decoder 104. Here, the power supply control may be performed by con-trolling an electronic control switch provided on a power supply line, by switching between a normal operation mode and a power down mode through register settings of an IC or LSI used for the receiver apparatus, by stopping a clock of a logic circuit, or by controlling on/off of part of circuitry.

(3) The above embodiments describe the case where the time information extraction unit 106 extracts the time information from the output of the TS decoder 104, but the present invention is not limited to this. For example, the time information may be extracted from the output of the error correction circuit 105.

The above embodiments describe the case where the time information is extracted from a TS packet. However, even in the case where the time information is not contained in a TS packet and so cannot be extracted from the TS packet, the present invention is applicable so long as the reception interval of each program in a time-division multiplexed signal has been specified in advance.

(4) The above embodiments describe the case where the receiver apparatus receives a time-division multiplexed signal according to multicarrier transmission exemplified by DVB-H, but the present invention should not be limited to multicarrier transmission. The present invention is equally applicable to single-carrier transmission, so long as it is time-division multiplexed.

(5) The second embodiment describes the case where, when the pull-in time measuring unit 111 measures the pull-in time, the power-on time of the tuner 102 and the like is used as the pull-in start time and the time at which the BER or C/N after the channel selection of the tuner 102 becomes below the threshold value is used as the pull-in end time. However, the present invention is not limited to such. For instance, a time at which the channel selection of the tuner 102 begins may be used as the pull-in start time, and a time at which a loop filter output converges or a time at which frame synchronization is established as the pull-in end time.

(6) The second embodiment describes the case where pull-in time ΔTcap is determined by comparing the mean value of the pull-in times previously measured by the pull-in time measuring unit 111 with the predetermined value, but this is not a limit for the present invention. For example, pull-in, time A Tcap may be determined based on one previously measured pull-in time ΔTcap. Alternatively, pull-in time ΔTcap may be determined by adding a certain margin to the mean value of the previously measured pull-in times. Also, the mean value of the previously measured pull-in times may be an arithmetic mean, or a weighted mean calculated by assigning a smaller weight to a more distant past.

(7) The third embodiment describes the case where the receiver apparatus includes the signal quality evaluation unit 109 and the battery monitoring unit 112, but the signal quality evaluation unit 109 may be replaced with the pull-in time measuring unit 111.

The third embodiment describes the case where if the remaining battery level is insufficient, pull-in time ΔTcap is determined irrespective of the quality of the received signal, but this is not a limit for the present invention. For example, the user may decide whether pull-in time ΔTcap is to be set depending on the remaining battery level.

(8) In the above embodiments, the demodulation unit 103, the TS decoder 104, the error correction circuit 105, the time information extraction unit 106, the signal quality evaluation unit 109, the control unit 110, the battery monitoring unit 112, and the like may be realized by one-chip LSI.

INDUSTRIAL APPLICABILITY

The present invention can be used for a mobile receiver of digital broadcasting and digital communication that transmit a signal by time-division multiplexing.

DESCRIPTION OF REFERENCE NUMERALS

101 ... antenna
102 ... tuner
103 ... demodulation unit
104 ... TS decoder
105 ... error correction circuit
106 ... time information extraction unit
107 ... decoding unit
108 ... display unit
109 ... signal quality evaluation unit
110 ... control unit
111 ... pull-in time measuring unit
112 ... battery monitoring unit
121 ... AD conversion unit
122 ... AGC
123 ... AFC
124 ... FFT
125 ... channel equalizing unit
126 ... error correction unit.
141 ... Viterbi Decoding Unit
142 ... RS decoding unit

The invention claimed is:

1. A time division multiplexed signal receiver apparatus in which an operation of a receiver circuit is started before reception of an assigned signal, and stopped, when the reception of the assigned signal ends, until before reception of a next assigned signal, comprising:
   a pull-in time measuring unit operable to measure a pull-in time necessary for the operation of the receiver circuit to stabilize from when the operation of the receiver circuit is started;
   a holding unit operable to hold information showing at least one pull-in time previously measured by the pull-in time measuring unit;
   an evaluation unit is operable to evaluate a quality of the received assigned signal, based on the information held in the holding unit;
   a determination unit operable to determine an operation start time at which the operation of the receiver circuit is to be started for the reception of the next assigned signal, based on a result of the evaluation by the evaluation unit; and
   a control unit operable to start the operation of the receiver circuit at the determined operation start time.

2. A signal reception method used in a time division multiplexed signal receiver apparatus in which an operation of a receiver circuit is started before reception of an assigned signal, and stopped, when the reception of the assigned signal ends, until before reception of a next assigned signal, comprising:
   a pull-in time measuring step of measuring a pull-in time necessary for the operation of the receiver circuit to stabilize from when the operation of the receiver circuit is started;
   a holding step of holding information showing at least one pull-in time previously measured by the pull-in time measuring step;
   an evaluation step of evaluating a quality of the received assigned signal, based on the information held in the holding step;
   a determination step of determining an operation start time at which the operation of the receiver circuit is to be started for the reception of the next assigned signal, based on a result of the evaluation by the evaluation step; and
   a control step of starting the operation of the receiver circuit at the determined operation start time.

3. An integrated circuit for executing a process in which an operation of a time division multiplexed signal receiver apparatus is started before reception of an assigned signal, and stopped, when the reception of the assigned signal ends, until before reception of a next assigned signal, comprising:
   a pull-in time measuring circuit operable to measure a pull-in time necessary for the operation of the receiver circuit to stabilize from when the operation of the receiver circuit is started;
   a holding circuit operable to hold information showing at least one pull-in time previously measured by the pull-in time measuring circuit;
   an evaluation circuit operable to evaluate a quality of the received assigned signal, based on the information held in the holding circuit;
   a determination circuit operable to determine an operation start time at which the operation of the receiver circuit is to be started for the reception of the next assigned signal, based on a result of the evaluation by the evaluation circuit; and
   a control circuit operable to start the operation of the receiver circuit at the determined operation start time.

* * * * *